United States Patent
Grundvig et al.

(10) Patent No.: US 8,233,228 B2
(45) Date of Patent: Jul. 31, 2012

(54) DLC-HEAD OFFSET COMPENSATION WHILE WRITING

(75) Inventors: Jeffrey Grundvig, Longmont, CO (US); Richard Rauschmayer, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 58 days.

(21) Appl. No.: 12/861,072

(22) Filed: Aug. 23, 2010

(65) Prior Publication Data

US 2011/0085262 A1    Apr. 14, 2011

Related U.S. Application Data

(60) Provisional application No. 61/249,697, filed on Oct. 8, 2009.

(51) Int. Cl.
*G11B 5/09* (2006.01)
(52) U.S. Cl. ......................................................... 360/51
(58) Field of Classification Search .................. None
See application file for complete search history.

(56) References Cited

U.S. PATENT DOCUMENTS

| 7,729,074 B2 * | 6/2010 | Venkataramani et al. ...... 360/51 |
| 2004/0091069 A1 * | 5/2004 | Liu et al. ........................ 375/350 |
| 2007/0025003 A1 * | 2/2007 | Erden et al. ..................... 360/29 |
| 2008/0304173 A1 * | 12/2008 | Albrecht et al. ................ 360/51 |
| 2009/0086366 A1 * | 4/2009 | Ehrlich ....................... 360/78.04 |

* cited by examiner

*Primary Examiner* — Daniell L Negron
*Assistant Examiner* — Regina N Holder

(57) ABSTRACT

In described embodiments, effects of frequency and phase error introduced at the outer diameter or inner diameter of the disk when a read head is used to maintain timing lock while the write head is used to write new data might be eliminated with a simple compensation circuit. Compensation circuits, modules or methods receive as input information i) write head radial position (e.g., from a wedge number that indicates the circumferential position of the heads), and ii) read head and write head relative physical offset. The timing error is measured by the system and might be automatically adjusted by the appropriate amount in order to reduce or to eliminate the differential head error when a write event (as opposed to a read event) is activated.

20 Claims, 2 Drawing Sheets

DLC-HEAD OFFSET COMPENSATION WHILE WRITING

CROSS-REFERENCE TO RELATED APPLICATIONS

This application claims the benefit of the filing date of U.S. provisional application No. 61/249,697, filed on Oct. 8, 2009, the teachings of which are incorporated herein by reference.

BACKGROUND OF THE INVENTION

1. Field of the Invention

The present invention relates to tracking in hard disk drives, and, in particular, to compensation for tracking error.

2. Description of the Related Art

Bit-patterned media is a technology that magnetic hard drive manufacturers are developing to move to the next level of density for hard disk storage. Bit-patterned media employs diamond-like carbon (DLC)-coated magnetic-head surfaces. A key requirement for enabling the advantages of this technology is the precise control of the write-time and write-head position so that increasingly smaller areas of magnetic media might be written precisely as the write-head passes over the top of these areas.

To maintain circumferential timing synchronization while writing data to the hard disk, timing synchronization marks are included with tracks of the hard disk and are used to maintain phase lock with the media, similar to present methods employed with servo wedges to stay aligned with a track. Since the read-head used to process these timing marks has a variable track offset from the write-head that depends on radial position due to the skew angle of the head arm, a small frequency error might be introduced when the read head and write head are not lined up on the same track. The amount of this error depends not only on the track offset between the read-head and the write-head, but also depends on the center of rotation offset from the center of fabrication of the hard disk.

Usually, this small frequency error resulting from track offset between the read head and the write head is negligible, and has been ignored for hard disk densities of the prior art. When the track offset between read head and write head is ignored in a system where the center of rotation is not exactly the same as the original center of track formation or fabrication, a small frequency and phase error, or center slip, is introduced at the outer diameter or inner diameter of the disk when the read head is used to maintain timing lock while the write head is used to write new data. However, this phase error might be a barrier to achieving the higher density required of bit-patterned media.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides for timing compensation when writing data during a write action to a hard disk of a hard disk drive. Timing compensation includes reading, by a read head, tracking data from the hard disk; generating timing control information for the read head from the tracking data, the timing control information employed to control a timing loop of the read head and a write head of the hard disk drive; and determining a timing error profile corresponding to a current center slip of the hard disk based on i) a write head radial position, ii) a read and write head relative physical offset, and iii) the timing control information. The timing error profile is generated based on the write head radial position, the relative physical offset, and the current timing information of the timing loop. The timing control information for the read head is adjusted based on the timing error profile.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, compensation reduces or eliminates effects of frequency and phase error introduced predominantly at the outer diameter or inner diameter of a hard disk when a read head is used to maintain timing lock while the write head is used to write new data. Compensation circuits, modules or methods operating in accordance with an embodiment of the present invention receive as input information i) write head radial position (e.g., from a wedge number that indicates the circumferential position of the heads), and ii) read head and write head relative physical offset. The timing error is measured by the system and might be automatically adjusted by the appropriate amount in order to reduce or to eliminate the differential head error when a write event (as opposed to a read event) is activated.

Figure 1:
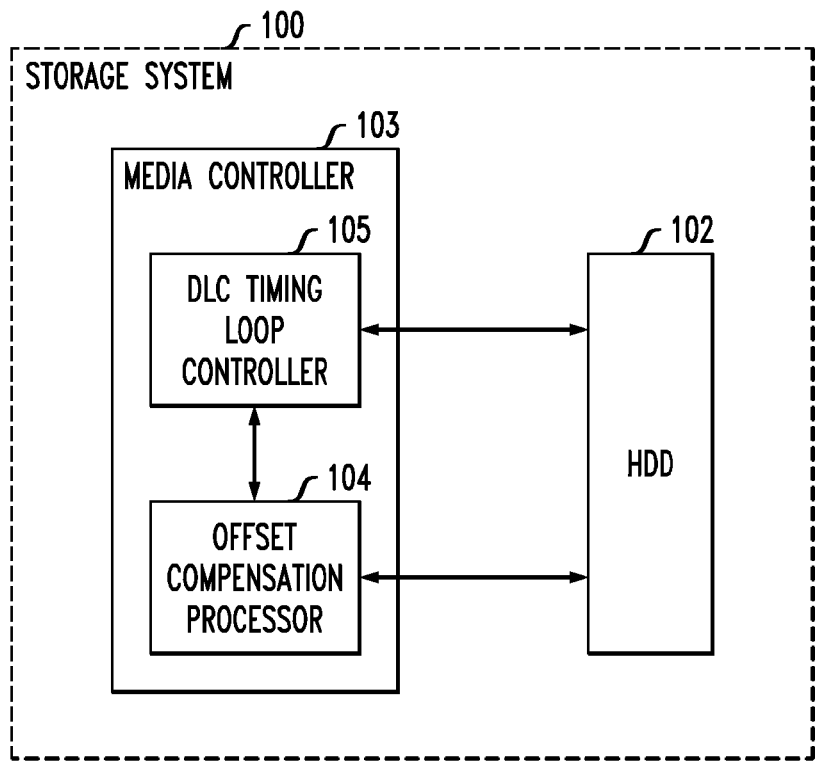
FIG. 1 shows a storage system having hard disk drive (HDD) and a media controller having an offset compensation processor operating in accordance with an exemplary embodiment of the present invention.

FIG. 1 shows a storage system 100 having hard disk drive (HDD) 102 and media controller 103. Hard disk drive (HDD) 102 might comprise a bit-patterned circular disk media (e.g., diamond-like carbon (DLC)-coated magnetic-head surface disk media), and read and write heads mounted on a head arm and positioned over the circular disk media, along with other circuitry known in the art of hard disk drives to control such elements, such as motors, arm controllers, read and write head controllers, internal clock and timing control circuits, and the like.

Media controller 103 comprises offset compensation processor 104 and DLC timing loop controller 105. In operation, DLC timing loop controller 105 receives timing information of the hard disk through reading Servo Address Marks (SAMs) on the disk media through the read head. This timing information might be used by the DLC timing loop controller to control a DLC timing loop that provides timing to HDD 102 to control one or more internal clocks of HDD 102 from which, for example, the read head timing, write head timing, head arm movement, and the spin rate of the disk media is derived. The DLC timing loop generally controls those clock signals employed to adjust the spin rate of the media with respect to a general timing loop that controls reading/writing on a bit-by-bit basis to the hard disk.

By comparing the occurrences of the SAMs read by HDD 102 and the internal clock and/or spin rate of the hard disk, at least one of offset compensation processor 104 and DLC timing loop controller 105 might be configured to determine a relative error between the actual and desired spin rate for a given read or write action. For a read action (read data operation), the internal clock of HDD 102 might then be controlled directly from the detected SAMs to provide the desired spin rate when compared to the timing measured from the detected SAMs through feedback in a timing control loop (e.g., phase-locked loop timing control). When writing data initiated by a write action, however, frequency and phase error effects are introduced through read and write head relative physical offset on a head arm of HDD 102 at the outer diameter or inner diameter of the disk when SAM data from the read head is used to maintain timing lock of the internal clock, and thus, spin rate, as described subsequently.

Figure 2:
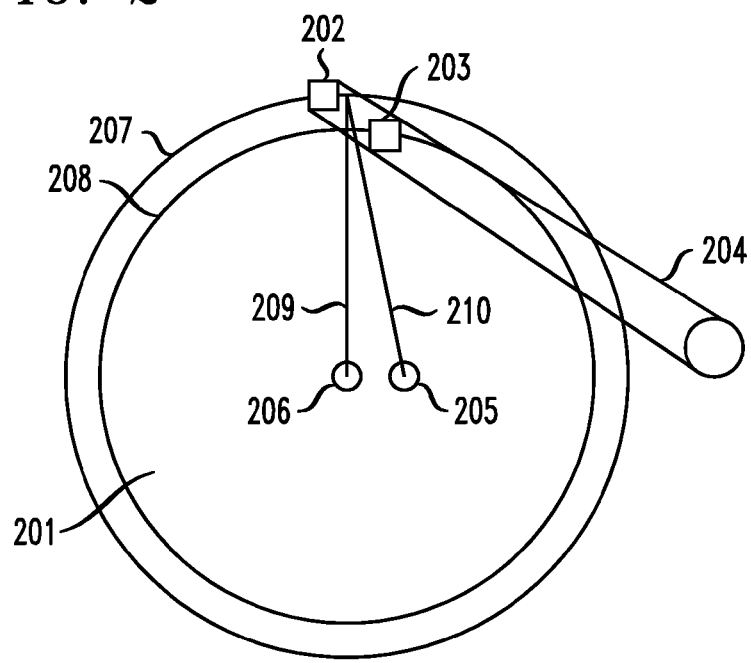
FIG. 2 shows an exemplary configuration of a read/write head as positioned over bit-patterned circular disk media as an illustration of track offset.

FIG. 2 shows an exemplary configuration of a read/write head as positioned over bit-patterned circular disk media 201 as an illustration of track offset between read head 202 and write head 203 of the read/write head assembly on head arm 204. As is illustrated in FIG. 2, when a center of rotation 205 of disk 201 is different than a center of fabrication 206, at certain angles of head arm 204 when read head 202 and write head 203 are riding on different tracks (shown in FIG. 2 as Track A 207 and Track B 208), radial lines 209 and 210 do not intersect both Track A 207 and Track B 208 at the same points at all times. Lines 209 and 210 move relative to one another in a sinusoidal fashion since i) center of fabrication 206 moves around center of rotation 205 when disk media 201 is spinning, and ii) lines 209 and 210 do not intersect both Track A 207 and Track B 208 at the same points due to read head 202 and the write head 203 being physically separated by a predefined distance on head arm 204.

Since the timing synchronization is maintained through reading timing marks from circular disk media 201 through read head 202, then, if DLC timing control loop 105 forces the measured phase error over Track A 207 to be zero, this action by DLC timing control loop 105 forces lines 209 and 210 to match up or intersect at the same point under the read head on Track A 207, as shown. So, if there is zero timing phase error on maintaining read head 202's position over Track A 207, then there is a phase error introduced on Track B 208 due to the physical distance separation of read head 202 and write head 203 (of the read/write head assembly on head arm 204). This occurrence of error is known as center slip of the HDD. As the disk rotates a full 360 degrees, the phase error introduced on Track B 208 follows a sinusoidal error profile, half the period being ahead of Track A 207 and half the period being behind Track A 207, know in the art as "center slip".

For example, using values projected for Bit Patterned Media specifications, the magnitude of the worst case phase error between the two tracks might be on the order of +/−15% of a bit cell at the peaks of the sinusoidal error profile. This much phase error might cause significant degradation in the written data error rate.

In accordance with embodiments of the present invention, to correct for this phase error, the timing control loop output signal from DLC timing loop controller 105 (FIG. 1) that controls the internal clock of HDD 102 is modified to follow a specified error profile, rather than to drive the error to zero, when following a track during write operations. For preferred embodiments of the present invention, the specified error profile follows a sinusoidal pattern that is the inverse of the frequency and phase error introduced through center slip. Consequently, the timing loop is modified to force the read-head to follow a sinusoidal error profile such that the two lines 209 and 210 (FIG. 2) might intersect at the same point on Track B 208 at all times, rather than on Track A 207.

The desired error profile might be generated using several options. A first option causes firmware to write to registers in a sinusoid generator circuit where the firmware specifies the magnitude and initial phase of the sinusoid. A second option adaptively sets the magnitude and phase of the desired sinusoid based on repetitive error of the timing loop, for example, with a least mean square (LMS) error-type algorithm. A third option causes firmware to simply write a desired error amount in an error offset register every so often, (for example, with a read of each servo wedge) to create a staircase-like approximation of the desired sinusoid. The output of these registers is then applied to the control signal of the control timing loop through, e.g., DLC timing loop controller 105 (FIG. 1) to vary the internal clock of HDD 102.

Figure 3:
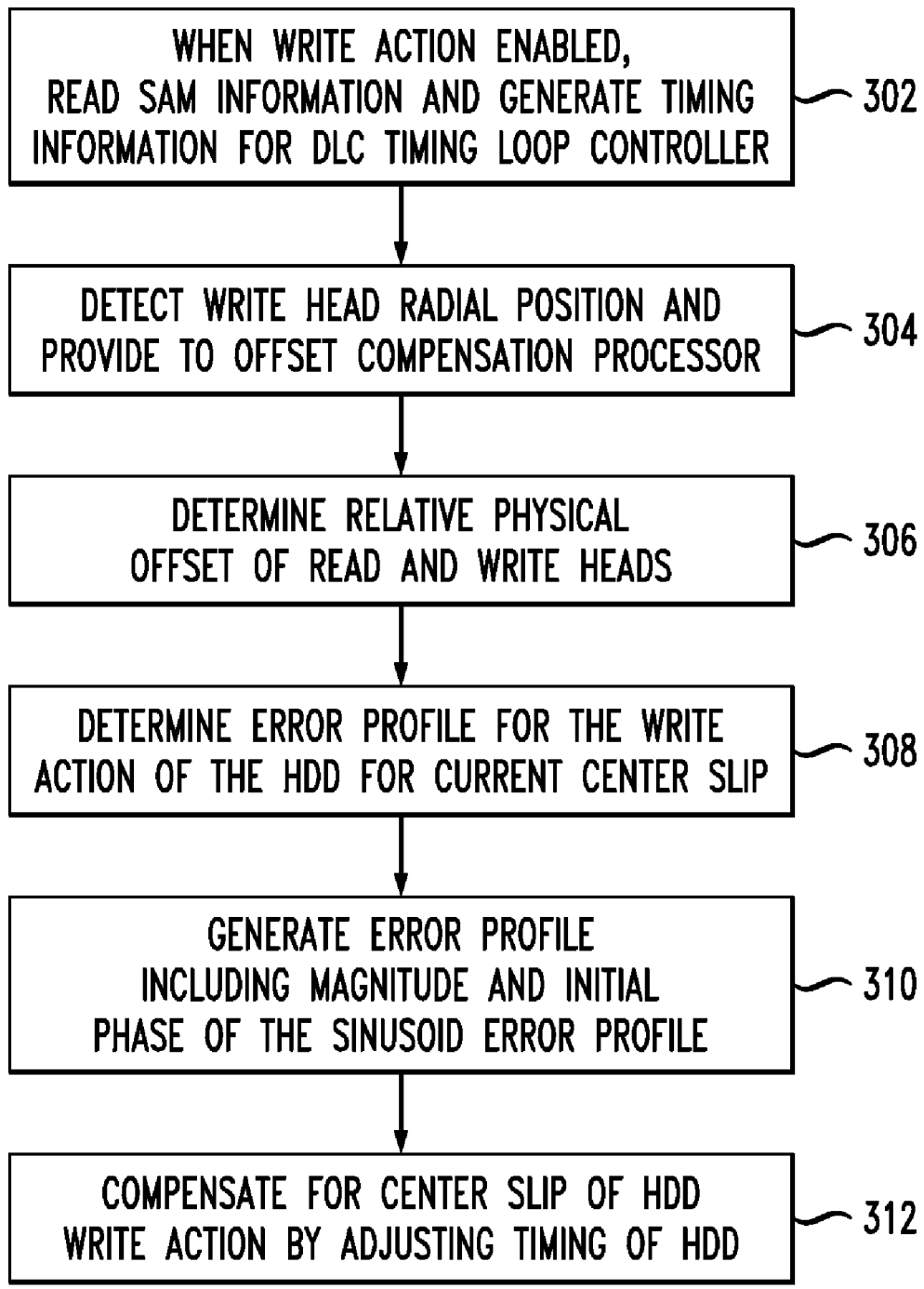
FIG. 3 shows a method of adjusting timing error in a HDD system to compensate for differential head error during a write event in accordance with an exemplary embodiment of the present invention

FIG. 3 shows a method of adjusting timing error by a DLC timing loop in a HDD system to reduce or to eliminate differential head error during a write event in accordance with an exemplary embodiment of the present invention. At step 302, when a write action is initiated, SAMs read by the read head to generate timing information for the DLC timing loop controller to generate DLC timing loop control information to the internal clock of the HDD, and this timing information is also provided to the offset compensation processor. At step 304, the write head radial position with respect to the hard disk is detected and also provided to the offset compensation processor. The write head radial position is detected by, for example, using wedge number(s) or similar information that is read from the hard disk to provide circumferential position of the read and write heads.

At step 306, the relative physical offset between the read and write head on the head arm is retrieved from memory by the offset compensation processor. The relative physical offset between the read and write head on the head arm is generated from predetermined information based on the fixed distance between the read and write heads on the head arm. The relative physical offset is generated based on the write head radial position since the physical position of the arm changes (e.g., as the arm swings between the outer-most and inner-most tracks) with respect to the radial distance from the center of the hard disk and the particular track the head is on, the relative physical offset between the read and write heads changes as the arm moves to the outer-most and inner-most edges of the hard disk. Memory might be used to store sets of values for the relative physical offset that are retrieved directly, or a discrete subset of these values that are retrieved and used with the write head radial position information to calculate precise values for the relative physical offset.

At step 308, based upon the write head radial position and the relative physical offset, the offset compensation processor determines an error profile for the write action of the HDD. At step 310, the offset compensation processor generates a sinusoid error profile, including magnitude and initial phase of the sinusoid error profile, based on the write head radial position, the relative physical offset, and the current timing information of the DLC timing loop. At step 312, the DLC timing loop controller compensates for center slip of the HDD by adjusting the internal clock of the HDD in accordance with sinusoid error profile generated at step 310.

While the above describes compensation for error during the initiation of a write action, the frequency and phase error detection, measurement and compensation process that provides a sinusoidal error profile to compensate for center slip might occur in various ways. During a write action, the method might be i) initiated once for the write action, ii) initiated and then repeated at predefined intervals during the write action, or iii) run continuously. Similarly, if multiple write actions occur, the method might only be initiated for a single write action, and not for subsequent write actions until the radial distance change in arm position (and hence, the read and write head positions) exceeds a certain threshold.

The techniques described herein might also be employed to improve the frequency match for conventional media, rather than just for patterned hard disk media. For conventional media, if the center of rotation moves relative to where the center was when the tracks were initially formed, the same effect will cause a repetitive sinusoidal frequency error, since the writing and reading of the data are performed with the two different heads. While this frequency and phase error is very small, this error might become a factor in timing loop performance, as detector capabilities improve. In order to keep the residual frequency below a desired range and for programs with large enough center slip specification, some type of compensation employing embodiments of the present invention might be required.

Embodiments of the present invention provide a relatively simple and effective way to compensate for center slip induced read/write head offset phase or frequency error. Consequently, higher density and improved read and write operation performance in a hard disk drive system might be improved over prior art systems.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface," "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of timing compensation when writing data during a write action to a hard disk of a hard disk drive, the method comprising:
   reading, by a read head, tracking data from the hard disk;
   generating timing control information for the read head from the tracking data, the timing control information employed to control a timing loop of the read head and a write head of the hard disk drive;
   determining a timing error profile corresponding to a current center slip of the hard disk based on i) a write head radial position, ii) a read and write head relative physical offset, and iii) the timing control information; generating the timing error profile based on the write head radial position, the relative physical offset, and the current timing information of the timing loop; and
   adjusting the timing control information for the read head based on the timing error profile thereby accounting for the current center slip.

2. The invention as recited in claim 1, wherein the step of adjusting the timing control information for the read head based on the timing error profile includes driving a magnitude and a phase of a timing error of the write head to zero.

3. The invention as recited in claim 2, wherein the step of determining a timing error profile includes generating the read and write head relative physical offset based on i) a distance of the read head and the write head on a head arm of the hard drive, ii) and the write head radial position.

4. The invention as recited in claim 2, wherein reading tracking data includes reading Servo Address Marks (SAMs) from tracks of the hard disk, and reading wedge numbers corresponding to the write head radial position.

5. The invention as recited in claim 1, wherein the step of generating the timing control information includes controlling write head timing to match a spin rate and a media position over a track of a diamond-like carbon (DLC)-coated disk media.

6. The invention as recited in claim 1, wherein, for the adjusting step, the timing error profile is a sinusoidal timing error profile.

7. The invention as recited in claim 6, wherein the step of generating the timing error profile includes initializing a sinusoidal error generator with an initial magnitude and an initial phase of the timing error profile from firmware, and then generating the timing error profile from the initial magnitude and the initial phase.

8. The invention as recited in claim 6, wherein the step of generating the timing error profile adaptively sets a magnitude and a phase of the timing error profile based on a repetitive error of the timing loop.

9. The invention as recited in claim 6, wherein the step of generating the timing error profile includes periodically initializing a sinusoidal error generator with an updated magnitude and an updated phase of the timing error, and then generating the timing error profile as a discrete staircase approximation of a sinusoid.

10. The invention as recited in claim 1, further comprising the step of repeating the method at predefined intervals during the write action.

11. The invention as recited in claim 1, further comprising the step of repeating the method based on one or more subsequent write head positions.

12. Apparatus for timing compensation when writing data during a write action to a hard disk of a hard disk drive, the apparatus comprising:
   a read head configured to read tracking data from the hard disk;
   a media controller having a timing loop controller and an offset compensation processor, wherein the timing loop controller configured to generate timing control information for the read head from the tracking data, the timing control information employed to control a timing loop of the read head and a write head of the hard disk drive; wherein the offset compensation processor configured to determine a timing error profile corresponding to a current center slip of the hard disk based on i) a write head radial position, ii) a read and write head relative physical offset, and iii) the timing control information; wherein the offset compensation processor generates the timing error profile based on the write head radial position, the relative physical offset, and the current timing information of the timing loop; and
   wherein the timing loop controller adjusts the timing control information for the read head based on the timing error profile thereby accounting for the current center slip.

13. The invention as recited in claim 12, wherein the timing loop controller adjusts the timing control information for the read head based on the timing error profile includes driving a magnitude and a phase of a timing error of the write head to zero.

14. The invention as recited in claim 13, wherein the offset compensation processor is further configured to determine the read and write head relative physical offset based on i) a distance of the read head and the write head on a head arm of the hard drive, and ii) the write head radial position.

15. The invention as recited in claim 13, wherein the read head reads Servo Address Marks (SAMs) from tracks of the hard disk, and wedge numbers corresponding to the write head radial position.

16. The invention as recited in claim 12, wherein the timing loop controller, via the timing control information, is further configured to control write head timing to match a spin rate and a media position over a track of a diamond-like carbon (DLC)-coated disk media.

17. The invention as recited in claim 12, further comprising a sinusoidal error generator, wherein the media controller is further configured to initialize the sinusoidal error generator with an initial magnitude and an initial phase of the timing error profile from firmware, and the timing loop controller then generates the timing error profile from the initial magnitude and the initial phase.

18. The invention as recited in claim 12, wherein the media controller is configured to adaptively set a magnitude and a phase of the timing error profile based on a repetitive error of the timing loop.

19. The invention as recited in claim 12, further comprising a sinusoidal error generator, wherein the media controller is further configured to periodically initialize the sinusoidal error generator with an updated magnitude and an updated phase of the timing error, and the timing loop controller then generates the timing error profile as a discrete staircase approximation of a sinusoid.

20. A machine-readable storage medium, having encoded thereon program code, wherein, when the program code is executed by a machine, the machine implements a method for timing compensation when writing data to a hard disk of a hard disk drive, comprising the steps of:

reading, by a read head, tracking data from the hard disk;
generating timing control information for the read head from the tracking data, the timing control information employed to control a timing loop of the read head and a write head of the hard disk drive;
determining a timing error profile corresponding to a current center slip of the hard disk based on i) a write head radial position, ii) a read and write head relative physical offset, and iii) the timing control information;

generating the timing error profile based on the write head radial position, the relative physical offset, and the current timing information of the timing loop; and
adjusting the timing control information for the read head based on the timing error profile, thereby accounting for the current center slip.

* * * * *